Feb. 3, 1953 R. F. TIBBETTS 2,627,383
FISHING REEL
Filed Nov. 18, 1947
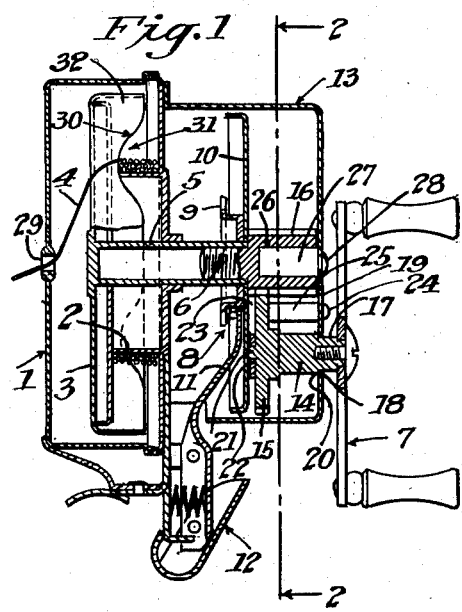
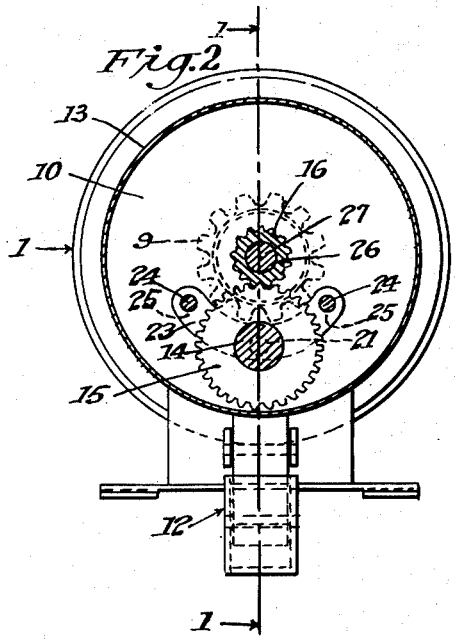
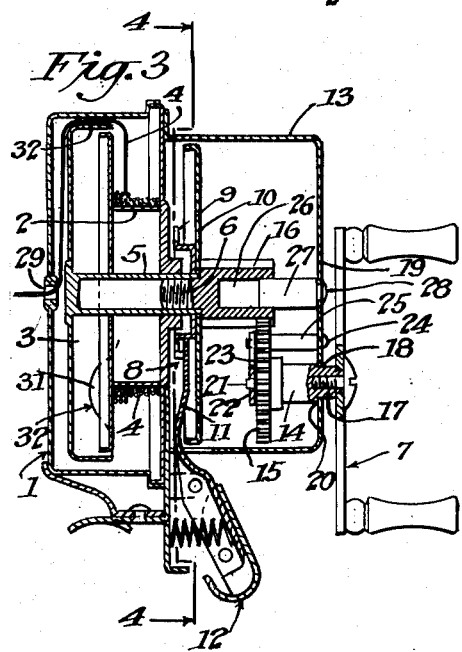
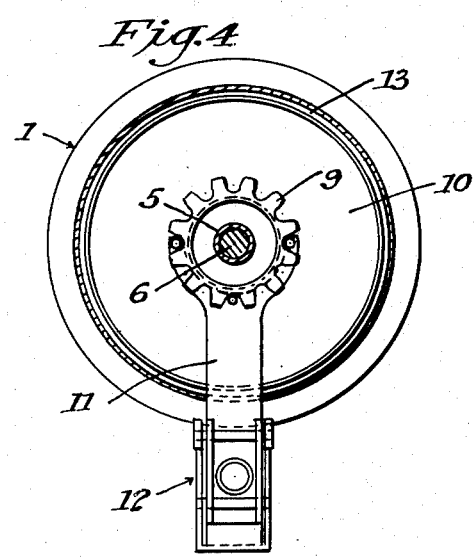
INVENTOR:
Raymond F. Tibbetts,
BY
Alan Franklin,
ATTORNEY.

Patented Feb. 3, 1953

2,627,383

UNITED STATES PATENT OFFICE 2,627,383

FISHING REEL

Raymond F. Tibbetts, Los Angeles, Calif.

Application November 18, 1947, Serial No. 786,592

1 Claim. (Cl. 242—84.5)

This invention relates to fishing reels, and more particularly to the type of fishing reel including a stationary spool and a "flyer" for winding the fishing line on the spool.

The general object of this invention is to provide a fishing reel, by means of which the speed of retrieving the line is considerably increased to prevent a game-fish, such as a bass, caught on the hook of the line, from swimming ahead faster than the retrieving line, and, by dexterous movements, throwing the hook out of his mouth and escaping.

Another object is to provide a fishing reel by means of which the retrieving speed of the line and an artificial bait connected to the line, is materially increased for more effectively luring a fish to the bait.

Other objects and advantages will appear hereinafter as this specification progresses.

The invention is illustrated in the annexed drawing, which forms a part of this specification, and in which:

Fig. 1 is a longitudinal section of a fishing reel embodying my invention, taken on line 1—1 of Fig. 2, showing the reel unlocked to permit winding or unwinding of the line.

Fig. 2 is a transverse section of Fig. 1 taken on line 2—2 of Fig. 1.

Fig. 3 is a view like Fig. 1, except that the reel is shown locked to prevent winding or unwinding of the line.

Fig. 4 is a transverse section of Fig. 3 taken on line 4—4 of Fig. 3.

Referring more particularly to the drawing, in which the same parts are designated by the same reference numerals in all of the figures, 1 designates a casing; 2 a stationary spool; 3 a flyer for winding the line 4 on said spool; 5 a flyer driven sleeve spindle; 6 a drive spindle threaded in said flyer spindle; 7 a line-winding crank; 8 a flyer lock, including a toothed wheel 9, and disc 10 secured on said flyer spindle, and a pawl 11 for engaging said toothed wheel; 12 a thumb latch for engaging said pawl 11 for holding the lock 8 in its locked or unlocked position; and 13 a cover for enclosing said lock 8 and certain other parts of the reel, all of which parts are included in a conventional stationary spool fishing reel.

My invention includes a crank shaft 14 on the outer end of which is secured the crank 7; a drive gear 15 formed on the inner end of said crank shaft; and a pinion 16 formed on the outer end of the drive spindle 6 in mesh with said drive gear 15. The crank shaft 14 is formed with a reduced outer end 17 which extends through and is journaled in a bearing 18 in the outer end wall 19 of the cover 13, and there being an annular shoulder 20 at the base of said reduced end 17, which shoulder turnably engages the inner side of said cover end wall 19. The drive gear 15 is formed on its inner side with a stud journal 21, which is turnably fitted in a bearing 22 in an arcuate bearing plate 23 which plate is secured at its ends respectively, to the cover end wall 19 by screws 24, which extend through said cover wall and through spacing sleeves 25 interposed between said wall and the bearing plate 23, with the ends of the screws in threaded engagement with the ends, respectively of said bearing plate. The pinion 16 is formed with an axial bore 26 extending thereinto from the outer end thereof, and a stud-journal 27 is riveted at its outer end by rivet 28 in the outer end wall 19 of the cover 13 and extends into and is turnably fitted in said bore 26 in said pinion 16 whereby said pinion is slidably journaled in said cover 13 in mesh with the drive gear 15.

The operation of my invention is as follows:

The reel being locked, as shown in Fig. 2 of the drawing, the rod on which the reel is mounted is swung by the fisherman to pay out the line 4, whereupon the weight of the bait, hook and line pulls the line off the spool over and around the locked flyer 3 through the guide opening 29 in the end wall of the casing 1. When a fish bites the hook on the line 4 and pulls on the line, the fisherman depresses the thumb latch 12 and thereby unlocks the flyer lock 8 and the flyer 3, and the fisherman then grips the handles of the crank 7 and rotates said crank, crank shaft 14 and drive gear 15, and said gear meshing with the pinion 16 rotates said pinion, pinion spindle 6, flyer spindle 5 and flyer 3, whereupon the line 4 is engaged by the edge 30 of the cut-out portion 31 of the rotating flyer annulus 32 and the line is thereby wound by the flyer on the stationary spool 2 until the fish is brought in on the hook and line; and the gear 15 being larger than the pinion 16 said pinion, spindles 6 and 5, and the flyer 3 are rotated faster than the crank 7 and gear 15, so that the line 4 is wound on the spool and drawn in faster than the fish on the hook and line can swim, whereby the fish is prevented from swimming ahead of the line and throwing the hook out of his mouth and escaping.

I claim:

In a fishing reel, a non-rotatable spool, a flyer, a flyer spindle rotatably and slidably mounted in the reel whereby said flyer may be rotated, and moved into or out of line-winding position, a crank, a drive gear rotatable by said crank, a pinion, secured on said flyer spindle and slidably mounted, in mesh with said drive gear for rotating said flyer spindle and flyer, a toothed wheel secured on said flyer spindle, a pawl for engaging said toothed wheel for locking said flyer against rotation, a thumb-actuated latch for swinging said pawl into or out of engagement with said toothed wheel and for locking said flyer spindle and flyer against rotation, when said pawl is swung into engagement with said toothed wheel.

RAYMOND F. TIBBETTS.

REFERENCES CITED

The following references are of record in the file of this patent:

UNITED STATES PATENTS

| Number | Name | Date |
|---|---|---|
| 2,179,413 | Kolosso | Nov. 7, 1939 |
| 2,229,470 | Pezon | Jan. 21, 1941 |
| 2,299,156 | Lind | Oct. 20, 1942 |

FOREIGN PATENTS

| Number | Country | Date |
|---|---|---|
| 22,597 of 1907 | Great Britain | June 11, 1908 |
| 402,080 | Great Britain | Nov. 20, 1933 |
| 813,087 | France | Feb. 15, 1937 |
| 878,594 | France | Oct. 19, 1942 |
| 909,825 | France | Jan. 7, 1946 |